Sept. 22, 1925.

A. PRESS 1,554,231

HYSTERETIC GENERATION OF ELECTROMAGNETIC WAVES

Filed Feb. 18, 1921   3 Sheets-Sheet 1

Inventor

Abraham Press

Sept. 22, 1925.

A. PRESS

HYSTERETIC GENERATION OF ELECTROMAGNETIC WAVES

Filed Feb. 18, 1921   3 Sheets-Sheet 2

Inventor
Abraham Press

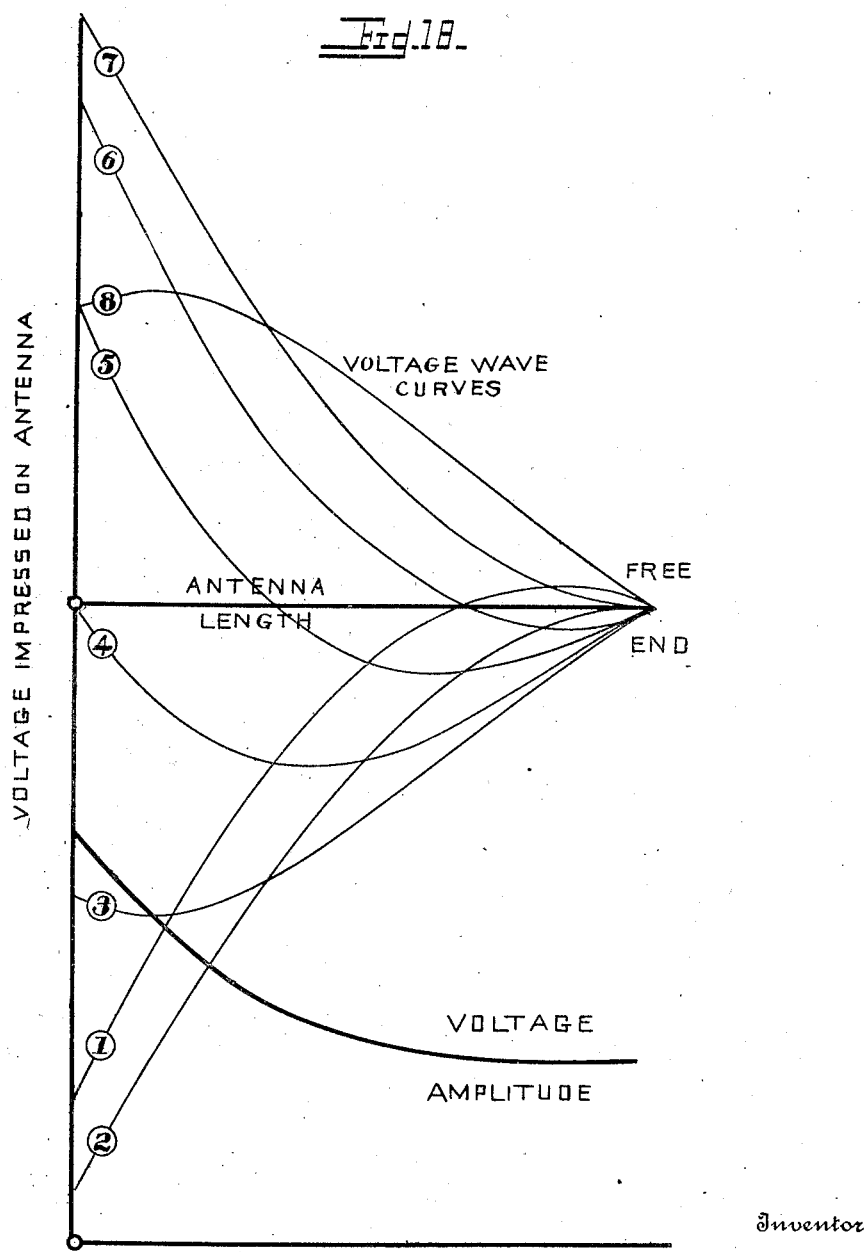

Patented Sept. 22, 1925.

1,554,231

UNITED STATES PATENT OFFICE.

ABRAHAM PRESS, OF WASHINGTON, DISTRICT OF COLUMBIA.

HYSTERETIC GENERATION OF ELECTROMAGNETIC WAVES.

Application filed February 18, 1921. Serial No. 446,119.

*To all whom it may concern:*

Be it known that I, ABRAHAM PRESS, a citizen of the United States, residing at Washington, in the District of Columbia, have invented certain new and useful Improvements in Hysteretic Generation of Electromagnetic Waves, of which the following is a specification.

This invention relates to the production of electromagnetic phenomena and has for one of its principal objects the production of progressive electromagnetic waves by means of electric and magnetic (one or both) hysteresis or their equivalents.

Heretofore in the art of wireless telegraphy it has been assumed that absorption phenomena were things to be avoided if effective progressive electromagnetic radiation was to be produced. I have found that for the production of progressive radiation of the Poynting type it is absolutely essential that hysteretic phenomena be present, or their equivalent. By equivalence, it should be pointed out, is meant, in the case of electric phenomena, the resistance equivalent of a hysteretic loss in the dielectric, of the condenser action of the antenna. In the case of magnetic hysteretic equivalent is meant the series resistance in the line of an antenna structure representing the hysteresis resistance due to the linking self-induction field about the antenna wire.

On turning to the theory, we find that in the case of Hertz the founder, so-called, of progressive electromagnetic wave phenomena, that in his mathematical theory he virtually begged the question by assuming a wave form of the progressive type for the magnetic field component resultantly set up about his oscillator. The expression for the magnetic field was not referred back to the voltage and current distributions of his oscillator, since for this element he used as his unit the electrostatic moment defined by the charge multiplied by the distance separating the charges. Strangely enough, it was well known principally through the labors of Oliver Heaviside that pulses of voltage could be sent out from the charging end of a long line or cable at the speed of light, but as the latter clearly indicated, on the supposition of no ohmic losses in the wire, and having only self-induction and capacity present, stationary waves would be set up, which by no stretch of the imagination could be viewed as giving rise to electromagnetic radiation calling for a considerable wattage loss.

Turning next to the work of Abraham in which the oscillations set up in a free ellipsoid were deduced, again do we find on the actual admission of Abraham that there is no ground for assuming that a true Poynting loss is to be assumed. This could only mean that again self-induction and capacity alone, in the ordinary sense of these terms, cannot be looked upon as the seat of the generation of electromagnetic radiation. In the December issue of 1918 of the Proceedings of the I. R. E., applicant has shown that even where the variation in the self-induction and capacity per unit of length of an antenna varies from point to point, that one has still to contend with stationary wave distributions, and in the Proceedings of the I. R. E. for October, 1920, applicant gave graphs indicating the distributions of current and voltage on the basis of the former mathematical evaluations. In the December issue of 1920, a paper also occurs by the applicant in which it is again shown for the case of a straight wire, at least so far as a progressive wave of electromagnetic radiation is concerned, no true Poynting loss can take place where self-induction and capacity only are present.

Thus it may be said that except for those cases where a progressive wave is deliberately assumed, as in the case of the so-called deferred potentials of Lorentz, has any mathematical development been suggested which would give any physical insight into the mechanism of radiations, in the true sense of the term. As stated above, none of the later work is better than the original work of Hertz who, however, failed to connect the waves of progression with the elements of voltage and current distributions in the oscillator itself. As a consequence of the above, applicant has come to the conclusion, based upon Maxwell's Theory involving Instantaneous Potentials, that it is absolutely impossible to produce electromagnetic radiation by merely having the elements self-induction and capacity present without ohmic resistances that might simulate hysteretic losses of either type. Developing this idea further, applicant has discovered that by solving the problem of a transmission line for a sinoidal impressed E. M. F., loaded however with a distributed hysteretic self-induction and hysteretic capacity, that a progressive wave of E. M. F. and current toward the open end of the transmission line is produced. This is a discovery of the first importance in connection with radio telegraphic theory and consequences of this theory are developed below.

It is easily seen that if the above be true, then there are no reflections to speak of, at least from a radio-telegraphic point of view, because of the open end of a finite transmission line. Heretofore this type of phenomenon was only thought possible with transmission lines of infinite length. With the above type of progressive wave, then, knowing that it can be split up into properly coordinated stationary waves, the mathematical work of the applicant, given in the Proceedings of the I. R. E. for December, 1920, can be made use of to calculate a true Poynting radiation effect.

Thus, in a paper accepted for publication by the Institution of Electrical Engineers of Great Britain (Wireless Section) applicant has shown how to arrive at the voltage and current distributions in a hysteretically loaded antenna. This system has important consequences for the development of polyphase from single phase. Since the two field components of an antenna system radiate out from the antenna itself without giving back their energy to the system, the radiation loss according to the above work corresponds actually to both a magnetic and/or an electric hysteretic loss for the antenna. Thus, as a further discovery, in order to explain electromagnetic radiation, applicant looks upon an antenna as a hysteretically loaded line setting up waves of potential and current towards the free end of the antenna, which latter waves then acting on the etheric medium about the system produce in consequence electromagnetic radiations, which of themselves take on the nature of a further hysteretic loading for the antenna. The difference between the true radiation loss and the actual aggregate loss of the antenna then corresponds to the requisite amount of energy loss which had been found necessary to produce the electromagnetic radiation.

In view of the work indicated above, to wit, the publication in the December issue of the Proceedings of the I. R. E. for 1920, it is necessary to differentiate rather strongly between inductive effects and radiative effects. So far as the intensity of the field components is concerned, the mathematical work in both cases would be substantially the same, indicating that the law of magnetic and electric field intensities is substantially in accord with the findings of Eccles, Austin and Cohen. The measure, however, of true radiation would be, deducting the ohmic losses or absorptive losses due to electric and magnetic hysteresis effects in the ordinary sense, a considerable amount of energy less than that which would still have to be accounted for means other than by true ohmic conduction. In the case of stationary waves, the only loss would be an ohmic one due to the resistivity of the wire. Although the field components for high frequencies would still accord with the showing in the above mathematical citation, nevertheless the amount of energy loss would be ridiculously small and only dependent on transformer effects for any transfer of energy from the sending station to the magnetically linked or electrostatically linked receiving station. If no stations were present, no loss to correspond could occur.

Since, as indicated in a prior publication by applicant, (see "Treatment of harmonics in alternating-current theory by means of a harmonic algebra", University of California Engineering Publications, September 1919) for any particular frequency, a magnetic hysteretic effect is equivalent to a resistance in series with the magnetic field producing element, that is self-induction, it is easily seen that in practically all types of high-frequency apparatus, such hysteretic element must be present to at least some degree, however small. It should be clearly borne in mind, however, that in the teaching heretofore, skin-effect resistance and hysteretic resistance effects were considered to be absolutely deleterious and nonessential so far as radiation was concerned. Thus apart from actual showings in the prior art, it must be considered that prior inventors were aiming by their insistence on non-hysteretic conditions on a simple inductive effect corresponding to the stationary wave indications alone of applicant's paper of December, 1920, in the Proceedings of the I. R. E.

Thus it should also be borne in mind that even Hertz's work was by no means conclusive so far as true radiation is concerned. It should be remembered that for maximum effect when trying to illustrate that nodes were present, that the plane of his coil or detector had to be parallel to the axis of his oscillator. This is exactly opposite to the requirements of present-day practice where the plane of the coil is perpendicular to the wave front. The same thing applies, so far as hysteresis is concerned, to the capacity effect. It must be concluded, therefore, that the case is by no means proved and has by no means been proved up to the present, that true radio effects were being obtained, by virtue of the fact that both electric and magnetic hysteretic absorptions were being deliberately suppressed.

If, then, the teaching up to the present had been such as to lead one only to the so-called stationary wave effects, it will become much more evident how the present work marks a very decided step in the advance of true electromagnetic theory and practice. As a feature of the invention, therefore, it must be emphasized that the production of hysteretic conditions alone will suffice for the predominance of true radio telegraphic conditions over purely inductive ones. The prior art, therefore, applies only in so far as a precise showing in the drawings or embodiment would inevitably lead one to produce more or less true radiative phenomena.

As a consequence of the above teaching and showing I have incorporated herewith certain embodiments of my invention which necessarily follow from a true physical grasp of the requirements for radiative electromagnetic phenomena as contradistinguished from stationary wave electromagnetic phenomena, the latter theory of which has been gone into by the writer in the paper mentioned above. It is still true, however, that every progressive wave can be split up into two stationary waves and therefore the above type of analysis can be applied to suit, once the true facts are clearly grasped.

In order to emphasize the significance of the above discovery, applicant has deemed it advisable to give a further mathematical development substantiating the above conclusions. In an earlier disclosure, Serial Number 427,556, filed December 1, 1920, on the basis of likening radiation to hysteresis losses magnetically and electrically the following formulæ were derived for an antenna in the $z$ direction; viz.

$$e = v_0 \cdot \cosh q(h-z) \cdot \sin pt \quad \text{---(1)}$$

$$\frac{di}{dz} = -Cpje$$

$$e = v_0 \left[ \cosh \frac{2\pi b(h-z)}{\lambda} \cdot \cos \frac{2\pi a(h-z)}{\lambda} \cdot \sin pt + \sinh \frac{2\pi b(h-z)}{\lambda} \cdot \sin \frac{2\pi a(h-z)}{\lambda} \cdot \cos pt \right] \text{---(2)}$$

and the voltage amplitude function is obtained by squaring the sin $pt$ and cos $pt$ components separately and then taking the square root. Thus we have as a function of $z$ and $h$ only $$e_{amp} = v_0 \sqrt{\cosh \frac{4\pi b(h-z)}{\lambda} + \cos \frac{4\pi a(h-z)}{\lambda}}$$

Indeed it will now be shown that the form (2) actually leads to a progressive wave term plus a stationary wave term; both impressed upon the antenna by virtue of hysteresis losses. It is this fact, as stated above, that suggests for real radio-telegraphy, that it is always necessary so to co- In the above formula we have $$q^2 = -p^2 LC$$

where both L and C are complexes of the form $$\begin{aligned} L &= L_1 - L_2 j = L_1(1-n_1 j) \\ C &= C_1 - C_2 j = C_1(1-n_2 j) \end{aligned} \quad \text{---(1a)}$$

Here $$L_1 C_1 = \frac{1}{V^2}$$

for a straight wire antenna giving $$p^2 L_1 C_1 = \left(\frac{2\pi}{\lambda}\right)^2$$

but for coil antennas we have $$L_1 C_1 = \frac{\mu'}{V^2} \text{ or } p^2 L_1 C_1 = \left(\frac{2\pi}{\lambda}\right)^2 \mu'.$$

(For the evaluation of $\mu'$ see paper by writer in "The Electrician," London, June 7, 1918.) The $L_1$ and $C_1$ above represent the low frequency values of inductivity and capacity. Thus it follows $$q = j \cdot \frac{2\pi}{\lambda} \cdot \mu' \cdot \sqrt{(1-n_1 j)(1-n_2 j)} =$$
$$j \cdot \frac{2\pi}{\lambda} \cdot \mu' \sqrt{(1-n_1 n_2) - j(n_1 + n_2)}$$

and leads to the form $$q = j \frac{2\pi}{\lambda}(a - bj) = \frac{2\pi}{\lambda}(b + aj)$$

where the $a$ and $b$ values are made to depend upon the $n$'s. It should thus follow by virtue of (1) that ordinate things that a true progressive wave of E. M. F. is generated in the antenna so that when the wave is impressed on the ether progressive radio waves are a result. From this point of view, without an initial hysteresis loss, electric, magnetic or both, no Poynting radiation can take place. Otherwise, only stationary waves will result as Abraham's work and the writer's clearly indicate.

*Progressive wave potential.*—To bring out the progressive wave feature we note $$\cosh u = \sinh u + \epsilon^{-u}$$

so that rewriting (2) we have $$e = v_0 \left[ \sinh \frac{2\pi b(h-z)}{\lambda} \cdot \sin \left\{ \frac{2\pi a(h-z)}{\lambda} + pt \right\} + \epsilon^{\frac{-2\pi b(h-z)}{\lambda}} \cdot \cos \frac{2\pi a(h-z)}{\lambda} \cdot \sin pt \right]$$

The progressive wave of E. M. F. or $e_p$ is therefore $$e_p = v_0 \cdot \sinh \frac{2\pi b(h-z)}{\lambda} \cdot \sin\left\{\frac{2\pi a(h-z)}{\lambda} + pt\right\}$$

whereas the stationary wave now becomes $$e_s = v_0 \cdot \epsilon^{\frac{-2\pi b(h-z)}{\lambda}} \cdot \cos \frac{2\pi a(h-z)}{\lambda} \cdot \sin pt.$$

It is the voltage $e_p$ of the wire that sets up the progressive wave constituting the Poynting radiation proper as will be proved below. If such progressive wave is not pre-existent, then no radiation, strictly speaking, can take place. This is an important discovery and opens up new and improved methods of assuring that progressive electric and/or magnetic waves can be generated by an antenna, coil, or even a succession of condensers in parallel. The necessary and sufficient condition is that hysteresis be present or its equivalent. Incidentally it may be noted that the progressive wave of potential set up is seen to be at the expense of the stationary wave of potential. In the graph Fig. 18, showing the manner in which the wave of potential progresses an effective voltage distribution curve is also given, bearing out the Geissler tube experiments of Braun (and even Chant) that practically throughout the whole length of the antenna the voltage amplitude is substantially a constant.

$$J \cdot \sin \beta z = \cos \beta z$$
$$J \cdot \sinh \alpha z \cdot \sin \beta z = \sinh \alpha z \cdot \cos \beta z; \text{ etc.}$$
$$J \cdot \cos \beta z = J(J \cdot \sin \beta z) = -\sin \beta z = J^2 \cdot \sin \beta z,$$

and therefore as with time sinoids $$J^2 = -1.$$

$$e = v_0(JJ+j) \cdot \sinh \frac{2\pi b(h-z)}{\lambda} \cdot \sin \frac{2\pi a(h-z)}{\lambda} \cdot \sin pt \text{-----(3)}$$

since as heretofore $$j = \frac{1}{p} \cdot \frac{d}{dt}; \quad j^2 = -1$$

and
$$J \cdot J \cdot \sinh \alpha z \cdot \sin \beta z = \cosh \alpha z \cdot \cos \beta z.$$

In so far as the current $i$ along the coil or antenna wire depends on $$\frac{d}{dz} = z_1$$

$$z_1 \cdot \sinh \frac{2\pi b(h-z)}{\lambda} \cdot \sin \frac{2\pi a(h-z)}{\lambda} = -\frac{2\pi}{\lambda}\left\{b \cdot \cosh \frac{2\pi b(h-z)}{\lambda} \cdot \sin \frac{2\pi a(h-z)}{\lambda} + a \cdot \sinh \frac{2\pi b(h-z)}{\lambda} \cdot \cos \frac{2\pi a(h-z)}{\lambda}\right\} = -\frac{2\pi}{\lambda}\left\{bJ + aJ\right\} \cdot \sinh \frac{2\pi b(h-z)}{\lambda} \cdot \sin \frac{2\pi a(h-z)}{\lambda}.$$

From an operational standpoint, therefore, the algebraization desired is $$z_1 = -\frac{2\pi}{\lambda}(bJ + aJ).$$

*Current wave derivation.*—Before going further it will be of interest to determine the wave of current distribution along the antenna since in polyphase transformation from a single phase the coupling may be magnetic. To ease the mathematical work we shall define an operator J, analogous to the differentiative operator $$j = \sqrt{-1} = \frac{1}{p} \cdot \frac{d}{dt}$$

of Oliver Heaviside which when acting on a hyperbolic function whether combined with a circular function or not transforms the hyperbolic part only (partial differentiation) according to the following method $$J \cdot \sinh \alpha z = \cosh \alpha z$$

$$J \cdot \sinh \alpha z \cdot \sin \gamma z = \cosh \alpha z \cdot \sin \gamma z; \text{ etc.}$$

If then we can write $$J(\cosh \alpha z) = \sinh \alpha z = J(J \sinh \alpha z)$$

it follows necessarily $$J^2 = +1; \quad J = \frac{1}{\alpha} \cdot \frac{d}{dz}.$$

Again, when dealing with sinoidal operands such as the sinoidal parts of hyperbolic sinoids, and other than time operands we agree to define the operator $J$ as follows:

With the above two operators J and $J$ it is thus possible to considerably condense the formula for voltage by writing equivalently in the following $$i = -\frac{Cpj}{z_1} \cdot e$$

an algebraized evaluation of $z_1$ will help considerably. Thus with a hyperbolic sinoid we have on extending the ideas of Oliver Heaviside Where it should be understood that $bJ$ acting on the operand which is a hyperbolic sinoid, gives $$bJ \cdot \sinh \frac{2\pi b(h-z)}{\lambda} \cdot \sin \frac{2\pi a(h-z)}{\lambda} = b \cdot \cosh \frac{2\pi b(h-z)}{\lambda} \cdot \sin \frac{2\pi a(h-z)}{\lambda}.$$

In other words, $J$ only operates to change the hyperbolic function, whereas $J$ in a hyperbolic sinoid would only operate to change the sinoidal part and not the hyperbolic part. To effect the double change simultaneously would require the operator $JJ$, as indicated.

$$i = -\frac{Cpj}{z_1} \cdot e = Cpj \frac{e}{\frac{2\pi}{\lambda}(bJ+aJ)} = \frac{\lambda p C_1}{2\pi} \cdot \frac{1-n_2 j}{bJ+aJ} \cdot e$$

by virtue of $(1a)$. To simplify the denominator, $bJ+aJ$ can be conjugated as follows $$\frac{1}{bJ+aJ} = \frac{1}{bJ+aJ} \cdot \frac{bJ-aJ}{bJ-aJ} = \frac{bJ-aJ}{b^2J^2-a^2J^2}$$

However, because $$J^2 = +1; \quad J^2 = -1$$

$$i = -\sqrt{\frac{\mu' C_1}{L_1}} \cdot \frac{1-n_2 j}{a^2+b^2} \cdot (bJ-aJ)je = -\sqrt{\frac{\mu' C_1}{L_1}} \frac{n_2+j}{a^2+b^2} \cdot (bJ-aJ)e.$$

On rewriting we have $$i = -\sqrt{\frac{\mu' C_1}{L_1}} \cdot \frac{1}{a^2+b^2} \cdot \{n_2(bJ-aJ)+j(bJ-aJ)\}_1 \cdot e$$

and thus it now becomes necessary to reduce the operator $\{\}_1$ when combined with The above will enable the current function to be determined, especially for the case of galvanic effect in wire antennas, for we have it is seen that $$b^2 J^2 - a^2 J^2 = a^2 + b^2$$

and therefore we have, since $V$ is the velocity of light $$\frac{\lambda p}{2\pi} = \lambda \cdot \frac{2\pi f}{2\pi} = V = \sqrt{\frac{\mu'}{L_1 C_1}}$$

the operator $JJ+j$ occurring in the function (3). We have $$(JJ+j)\{n_2(bJ-aJ)+j(bJ-aJ)\}$$
$$= n_2(bJ-aJ)JJ - (bJ-aJ) + j\{n_2(bJ-aJ) + JJ(bJ-aJ)\}$$
$$= (a+bn_2)J + (an_2-b)J + j\{(b-an_2)J + (a+bn_2)J\}.$$

On interpreting backwards we have $$i = -\sqrt{\frac{\mu' C_1}{L_1}} \cdot \frac{1}{a^2+b^2} \cdot \Big[\Big\{(a+bn_2) \cdot \sinh \frac{2\pi b(h-z)}{\lambda} \cdot \cos \frac{2\pi a(h-z)}{\lambda} +$$

$$(an_2 - b) \cdot \cosh \frac{2\pi b(h-z)}{\lambda} \cdot \sin \frac{2\pi a(h-z)}{\lambda}\Big\} \sin pt + \Big\{(a+bn_2) \cdot \cosh \frac{2\pi b(h-z)}{\lambda} \cdot \sin \frac{2\pi a(h-z)}{\lambda} -$$

$$(an_2 - b) \cdot \sinh \frac{2\pi b(h-z)}{\lambda} \cdot \sin \frac{2\pi a(h-z)}{\lambda}\Big\} \cdot \cos pt\Big]$$

To bring out the progressive and stationary wave characteristics the $(a+bn_2)$ and $(an_2-b)$ terms can be combined to form two functions $()_1$ and $()_2$. Thus we find $$()_1 = (a+bn_2)\left[\sinh \frac{2\pi b(h-z)}{\lambda} \cdot \sin\left\{\frac{2\pi a(h-z)}{\lambda} + pt\right\} + \epsilon^{\frac{-2\pi b(h-z)}{\lambda}} \cdot \sin \frac{2\pi a(h-z)}{\lambda} \cdot \cos pt\right]$$

$$()_2 = (b-an_2)\left[\epsilon^{\frac{-2\pi b(h-z)}{\lambda}} \cdot \sin \frac{2\pi a(h-z)}{\lambda} \cdot \sin pt - \sinh \frac{2\pi b(h-z)}{\lambda} \cdot \cos\left\{\frac{2\pi a(h-z)}{\lambda} + pt\right\}\right]$$

The above terms when added lead to a resultant current wave component of progression $$i_p = \frac{VC_1 \cdot v_o}{a^2+b^2} \cdot \sinh \frac{2\pi b(h-z)}{\lambda}\left[(a+bn_2) \cdot \sin\left\{\frac{2\pi a(h-z)}{\lambda}+pt\right\} + an_2 - b)\cos\left\{\frac{2\pi a(h-z)}{\lambda}+pt\right\}\right]$$

combined with a stationary wave of current as follows:

$$i_s = \frac{VC_1 \cdot v_o}{a^2+b^2} \cdot \epsilon^{\frac{-2\pi b(h-z)}{\lambda}} \cdot \sin \frac{2\pi a(h-z)}{\lambda} \cdot \left\{(a+bn_2)\cos pt + (an_2-b)\sin pt\right\}$$

where $$i = i_s + i_p$$

$$i_p = \frac{VC_1 \cdot v_0}{\sqrt{a^2+b^2}} \cdot \sqrt{1+n_2^2} \cdot \sinh \frac{2\pi b(h-z)}{\lambda} \cdot \sin \left\{ \frac{2\pi a(h-z)}{\lambda} + pt + \tan^{-1} \frac{an_2-b}{a+bn_2} \right\}$$

$$i_s = \frac{VC_1 \cdot v_0}{\sqrt{a^2+b^2}} \cdot \sqrt{1+n_2^2} \cdot \epsilon^{\frac{-2\pi b(h-z)}{\lambda}} \cdot \sin \frac{2\pi a(h-z)}{\lambda} \cdot \sin \left\{ pt + \tan^{-1} \frac{a+bn_2}{an_2-b} \right\}.$$

It thus appears that there is a difference of phase $\psi$ before the progressive current wave and the progressive voltage wave given by $$\psi = \tan^{-1} \frac{an_2 - b}{a + bn_2}.$$

Thus by means of inductive action with respect to any choice of position along the antenna it is possible to excite a second or a third antenna with any desired time phase difference relative to the original antenna from a single phase source. This constitutes a considerable improvement over the Scott connection. In the matter of radiation, by angularly arranging spatially two antennas, for example, in the simplest case, with regard to an undesired receiving station, the elimination of jamming due to elliptically polarized waves would only be possible by means of a similarly arranged or constructed antenna system. The desired receiving station could therefore receive signals selectively and would not be jammed by plane polarized waves since the latter have been hitherto eliminatable by means of loops, directed antennas or the like. This is especially noteworthy where a multiplicity of elliptically polarized stations may be sending at once. Indeed it is also possible to "tune," in a sense, for hysteretic characteristic both in sending and receiving stations.

In the case of the stationary wave component of current the phase difference between such wave and the stationary voltage wave is given by the relation $$\cot \psi = \frac{a + bn_2}{an_2 - b}.$$

It should be remembered also that there is in reality a stationary wave component of current $i_{se}$ in phase with such stationary wave of E. M. F., to wit:

$$i_{se} = \frac{VC_1 \cdot v_0}{a^2+b^2} \cdot (an_2 - b) \cdot \epsilon^{\frac{-2\pi b(h-z)}{\lambda}} \cdot \sin \frac{2\pi a(h-z)}{\lambda} \cdot \sin pt.$$

*Watt consumption of radiating antenna.*—To obtain the instantaneous wattage it is necessary to take the time operator components in such a manner that $j^2 = +1$ in accordance with the Heaviside-Gibbs activity formula for two vectors $e$ and $i$. Then integrating over a complete cycle the average value is one-half so that $$\text{Watts} = \frac{1}{2} \cdot \frac{VC_1 \cdot v_0^2}{a^2+b^2} \cdot \left[ \{(a+bn_2) \cdot sh \cdot c + (an_2-b) ch \cdot s\} ch \cdot c + \{(a+bn_2) ch \cdot s - (an_2-b) \cdot sh \cdot c\} sh \cdot s \right]$$

Adding terms with like prefactors we have for one term $$(a+bn_2)(sh \cdot ch \cdot c^2 + sh \cdot ch \cdot s^2) = (a+bn_2) \cdot sh \cdot ch.$$

$$(an_2-b)(ch^2 \cdot s \cdot c + sh^2 \cdot s \cdot c) = (an_2-b) \cdot s \cdot c.$$

However, with hyperbolic functions $$ch \cdot sh = \frac{1}{2} sh_2$$

where the subscript refers to a doubled argument. Similarly for circular functions $$s \cdot c = \frac{1}{2} \cdot s_2.$$

The expression for the watt distribution, therefore, reduces to the following form (as a function of the distance $z$ along the antenna):

$$\text{Watts} = \frac{1}{4} \frac{VC_1 \cdot v_0^2}{a^2+b^2} \cdot \left[ (a+bn_2) \cdot \sinh \frac{4\pi b(h-z)}{\lambda} + (an_2-b) \cdot \sin \frac{4\pi a(h-z)}{\lambda} \right]$$

It is the above wattage less the true radiation losses, to be gone into below, that represents the requirement for antenna excitation in a Poynting sense. Obviously the hysteretic characteristics $n_1$ and $n_2$ should be so coordinated that maximum radiative efficiency is obtained.

*Study of radiative effects.*

*Progressive wave of radial displacement.*—Turning first to the radiative voltaic effect (see Proc. I. R. E. December 1920, page 528), as applicant has already shown it is necessary to solve the equation $$\frac{d^2 D_r}{dr^2} + \frac{1}{r} \cdot \frac{dD_r}{dr} - \left(\frac{1}{r^2} + \Delta^2\right) D_r = 0$$

with $$\Delta^2 = \frac{1}{V^2} \cdot \frac{d^2}{dt^2} - \frac{d^2}{dz^2}$$

to determine the electric and magnetic stresses produced in the circumambient ether. A suitable solution was found to be $$D_r = r_1 \cdot K_0(\Delta r) \cdot A$$

where A was chosen so as to give $$D_r = D_0 \text{ for } r = a_1$$

where $a_1$ is the effective radius of the antenna wire, parallel spaced antenna wires, or coil. For calculation of effective radii ($a_1$) see paper by applicant on Antenna Constants in "La Rev. Gén. d'Elec.," April 24, 1920.

To determine $D_0$ the elemental charge $dQ$ was investigated. Thus in electrostatic measure $$dQ = k \left(\frac{dC_1'}{dz} \cdot dz\right) \cdot e$$

whereas in magnetic measure with $e$ taken likewise we have $$dQ = \frac{1}{V_\mu^2} \cdot \left(\frac{dC_1'}{dz} \cdot dz\right) \cdot e_1$$

and $\mu = 1$ for the ether. In the above for a wire we have $$C_1' = \frac{z}{4.6 \log_{10}\left(\frac{h}{a_1}\right)}$$

with $a_1$ as the effective radius of the antenna, wire or coil. Thus for $\alpha$ we have $$\alpha = \frac{dC_1'}{dz} = \frac{1}{4.6 \log_{10}\left(\frac{h}{a_1}\right)}$$

$$D_0 = \frac{1}{2\pi a_1} \cdot \frac{1}{\mu V^2} \cdot \alpha \cdot e_1$$

so that, at least over the range considered, and neglecting end effects, it follows $$D_r = \frac{r_1 \cdot K_0(\Delta r)}{\{r_1 \cdot K_0(\Delta r)\}_{r=a_1}} \cdot \frac{\alpha}{\mu V^2} \cdot \frac{1}{2\pi a_1} \cdot e$$

and $e$ is the above impressed function of $z$ and $t$.

The above voltage $e$ impressed on the antenna when written in condensed notation was shown to be, viz:

$$e = v_0 (JJ + j) \cdot \sinh \frac{2\pi b(h-z)}{\lambda} \cdot \sin \frac{2\pi a(h-z)}{\lambda} \cdot \sin pt.$$

It is in the above voltage function that we have to remember $\Delta$ is a function of $d/dz$. This evaluation needs to be introduced in the $D_r$ function. Since we have seen $$z_1 = \frac{d}{dz} = -\frac{2\pi}{\lambda}(bJ + aJ) = -\frac{2\pi}{\lambda} J \left\{a + \frac{bJ}{J}\right\} = -\frac{2\pi}{\lambda} J\{a - bJJ\},$$

$$z_1^2 = -\left(\frac{2\pi}{\lambda}\right)^2 \cdot \{a^2 + b^2 J^2 J^2 - 2abJJ\} = -\left(\frac{2\pi}{\lambda}\right)^2 \cdot \{a^2 - b^2 - 2abJJ\}.$$

Again, for the time function $$t_1 = pj; \quad \frac{1}{V^2} \cdot \frac{d^2}{dt^2} = \frac{-p^2}{V^2} = -\left(\frac{2\pi}{\lambda}\right)^2.$$

That is it follows $$\Delta^2 = \frac{1}{V^2} \cdot \frac{d^2}{dt^2} - z_1^2 = \left(\frac{2\pi}{\lambda}\right)^2 \{a^2 - b^2 - 1 - 2abJJ\} = \left(\frac{2\pi}{\lambda}\right)^2 (a^2 - 1 - b^2)\{A - BJ\}^2$$

Where we also have the formulæ

$$A = \sqrt{\frac{1 + \sqrt{1 + \frac{4a^2 b^2}{(a^2 - b^2 - 1)^2}}}{2}}; \quad B = \sqrt{\frac{-1 + \sqrt{1 + \frac{4a^2 b^2}{(a^2 - b^2 - 1)^2}}}{2}}$$

because $t^2 = +1$. Thus it follows:

$$\Delta = \frac{2\pi}{\lambda} \cdot \sqrt{a^2 - 1 - b^2} \cdot (A - BJ)$$

$$D_r \equiv \left(\frac{a_1}{r}\right)^{1/2} \cdot \frac{\alpha}{\mu V^2} \cdot \frac{1}{2\pi a_1} \cdot \epsilon^{-\Delta(r-a_1)} \cdot v_0 \cdot (JJ+j) \cdot \sinh \frac{2\pi b(h-z)}{\lambda} \cdot \sin \frac{2\pi a(h-z)}{\lambda} \cdot \sin pt.$$

For the exponential terms we now see, writing $N^2 = a^2 - 1 - b^2$ $$\epsilon^{-\Delta(r-a_1)} = \epsilon^{\frac{-2\pi NA(r-a_1)}{\lambda}} \cdot \epsilon^{\frac{-2\pi NBJ}{\lambda}}$$

$$= \epsilon^{\frac{-2\pi NA(r-a_1)}{\lambda}} \left[\cos\left\{\frac{2\pi NB(r-a_1)}{\lambda}\right\} + J \cdot \sin\left\{\frac{2\pi NB(r-a_1)}{\lambda}\right\}\right],$$

with the operator $J = \sqrt{-1}$ exponentially that needed to be algebraized by means of De Moivre's theorem.

Thus for $D_r$ we have the following formula $$D_r \equiv \left(\frac{a_1}{r}\right)^{1/2} \cdot \frac{\alpha}{\mu V^2} \cdot \frac{v_0}{2\pi a_1} \cdot \epsilon^{\frac{-2\pi NA(r-a_1)}{\lambda}} \left\{\cos \frac{2\pi NB(r-a_1)}{\lambda} + J \cdot \sin \frac{2\pi NB(r-a_1)}{\lambda}\right\} \times$$

$$\cdot (JJ+j) \cdot \sinh \frac{2\pi b(h-z)}{\lambda} \cdot \sin \frac{2\pi a(h-z)}{\lambda} \cdot \sin pt.$$

To simplify the above function let $$C_r = \cos \frac{2\pi NB(r-a_1)}{\lambda}; \quad S_r = \sin \frac{2\pi NB(r-a_1)}{\lambda},$$

then it is found that the following operative function needs reduction $$(C_r + J \cdot S_r)(JJ + j) = C_r \cdot JJ + S_r \cdot J^2 J + j(J \cdot S_r + C_r) = (C_r \cdot J \cdot J + j \cdot J \cdot S_r) - (S_r \cdot J - j \cdot C_r).$$

On reintroduction we find $$D_r \equiv \left(\frac{a_1}{r}\right)^{1/2} \cdot \frac{\alpha}{\mu V^2} \cdot \frac{v_0}{2\pi a_1} \cdot \epsilon^{\frac{-2\pi NA(r-a_1)}{\lambda}}$$

$$\left[\left\{\cosh \frac{2\pi b(h-z)}{\lambda} \cdot \cos \frac{2\pi a(h-z)}{\lambda} \cdot \cos \frac{2\pi NB(r-a_1)}{\lambda} \cdot \sin pt\right.\right.$$

$$+ \sinh \frac{2\pi b(h-z)}{\lambda} \cdot \cos \frac{2\pi a(h-z)}{\lambda} \cdot \sin \frac{2\pi NB(r-a_1)}{\lambda} \cdot \cos pt$$

$$- \left\{\cosh \frac{2\pi b(h-z)}{\lambda} \cdot \sin \frac{2\pi a(h-z)}{\lambda} \cdot \sin \frac{2\pi NB(r-a_1)}{\lambda} \cdot \sin pt\right.$$

$$\left.\left. - \sinh \frac{2\pi b(h-z)}{\lambda} \cdot \sin \frac{2\pi a(h-z)}{\lambda} \cdot \cos \frac{2\pi NB(r-a_1)}{\lambda} \cdot \cos pt\right\}\right]_0$$

It is important to point out the latter formula can be transformed to prove, under the conditions that a traveling wave of voltage is set up hysteretically, in an antenna, coil or the like, that actual electromagnetic radiation phenomena are produced in the ether about such antenna or oscillator. To do this the expression $[\ ]_0$ will be transformed. Thus we have on factoring out sine and cosine terms:

$$[\ ]_0 = \left[\cos \frac{2\pi a(h-z)}{\lambda} \cdot \left\{\cosh \frac{2\pi b(h-z)}{\lambda} \cdot \cos \frac{2\pi NB(r-a_1)}{\lambda} \cdot \sin pt\right.\right.$$

$$\left.\left. + \sinh \frac{2\pi b(h-z)}{\lambda} \cdot \sin \frac{2\pi NB(r-a_1)}{\lambda} \cdot \cos pt\right\}\right]_1$$

$$- \left[\sin \frac{2\pi a(h-z)}{\lambda} \cdot \left\{\cosh \frac{2\pi b(h-z)}{\lambda} \cdot \sin 2\pi NB(r-a_1) \cdot \sin pt\right.\right.$$

Now in terms of the divergent development of the $K_1$ Bessel's (see page 530 l. c.) the first term need only be taken if $r$ is large enough, hence it follows $$\left.\left. - \sinh \frac{2\pi b(h-z)}{\lambda} \cdot \cos \frac{2\pi NB(r-a_1)}{\lambda} \cdot \cos pt\right\}\right]_2$$

However, by splitting up the cosh function in terms of a sinh function we find $$[\ ]_1 = \sinh \frac{2\pi b(h-z)}{\lambda} \cdot \cos \frac{2\pi a(h-z)}{\lambda} \cdot \sin\left\{pt + \frac{2\pi NB(r-a_1)}{\lambda}\right\}$$

$$+ \epsilon^{\frac{-2\pi b(h-z)}{\lambda}} \cdot \cos \frac{2\pi a(h-z)}{\lambda} \cdot \cos \frac{2\pi NB(r-a_1)}{\lambda} \cdot \sin pt.$$

Similarly $$[\ ]_2 = -\sinh \frac{2\pi b(h-z)}{\lambda} \cdot \sin \frac{2\pi a(h-z)}{\lambda} \cdot \cos\left\{\frac{2\pi NB(r-a_1)}{\lambda} + pt\right\}$$

$$+ \epsilon^{\frac{-2\pi b(h-z)}{\lambda}} \cdot \sin \frac{2\pi a(h-z)}{\lambda} \cdot \sin \frac{2\pi NB(r-a_1)}{\lambda} \cdot \sin pt.$$

Thus adding the two components we have finally $$D_r = \left(\frac{a_1}{r}\right)^{\frac{1}{2}} \cdot \frac{\alpha}{\mu V^2} \cdot \frac{v_0}{2\pi a_1} \cdot \epsilon^{\frac{-2\pi N(r-a_1)}{\lambda}} \cdot \left[\sinh \frac{2\pi b(h-z)}{\lambda} \cdot \sin\left\{pt + \frac{2\pi a(h-z)}{\lambda} + \frac{2\pi NB(r-a_1)}{\lambda}\right\}\right.$$

$$\left. + \epsilon^{\frac{-2\pi b(h-z)}{\lambda}} \cdot \cos\left\{\frac{2\pi a(h-z)}{\lambda} + \frac{2\pi NB(r-a_1)}{\lambda}\right\} \cdot \sin pt\right].$$

The above exhibits clearly a radiant wave in the $z$ as well as the $r$ directions, compounded with a stationary wave distribution which is likewise a function of $z$ and $r$ as well as of $t$. That radiation normal to the antenna should take place is particularly significant.

*Direction of wave front.*—So far as the progressive wave is concerned, we note for $z=o$ that $D_r$ is a maximum. For $z=h$ the $D_r$ is zero. The above would indicate an arrangement of abutting antennas whether conductively connected at the free ends or not and so inclined as to give focal or plane wave effects. Throughout the discussion it will be observed that the above conditions respecting wave fronts practically obtain so far as the progressive wave components are concerned.

*Progressive wave of magnetic intensity.*—In view of the fact that in cylindrical coordinates, with H having circular symmetry about the axis of $z$ we have the relation $$\frac{dD_r}{dt} = -\frac{dH}{dz}$$

$$H = -\frac{t_1}{z_1} \cdot D_r = -\frac{pj}{z_1} \cdot D_r$$

a study of the operator $z_1$ for exponential-sinoidal functions is therefore in order. It should be pointed out, however, that in the cases in practice where abutting antennas (T-antennas) are employed that the present analysis obtains since such a system can be represented equivalently by two single-arm antennas in abutting relationship above the earth and imaged with respect to the earth below by two other antennas sending out waves in precisely the same manner as the antenna system above. Naturally the above analysis applies equally well to antenna systems below the ground as well as above it.

We have $$z_1 \cdot \epsilon^{\frac{-2\pi b(h-z)}{\lambda}} \cdot \cos\left\{\frac{2\pi a(h-z)}{\lambda} + \frac{2\pi NB(r-a_1)}{\lambda}\right\} \cdot \sin pt$$

$$= -\frac{2\pi b}{\lambda} \cdot \epsilon^{\frac{-2\pi b(h-z)}{\lambda}} \cdot \cos\{\ \} \cdot \sin pt + \frac{2\pi a}{\lambda} \cdot \epsilon^{\frac{-2\pi b(h-z)}{\lambda}} \cdot \sin\{\ \} \cdot \sin pt$$

$$= \frac{2\pi}{\lambda}(b-aJ) \cdot \epsilon^{\frac{-2\pi b(h-z)}{\lambda}} \cdot \cos\left\{\frac{2\pi a(h-z)}{\lambda} + \frac{2\pi NB(r-a)_1}{\lambda}\right\} \cdot \sin pt.$$

With this type of operand the algebraization gives therefore $$z_1 = \frac{2\pi}{\lambda}(b-aJ).$$

Considering now the hyperbolic sinoid as operand we have $$\frac{-pj}{z_1} = \frac{pj\lambda}{2\pi} \cdot \frac{1}{bJ+aJ} = \frac{pj\lambda}{2\pi} \cdot \frac{bJ-aJ}{a^2+b^2} = j\frac{V_1(bJ-aJ)}{a^2+b^2}.$$

Operating therefore on the [ ] expression in $D_r$ we have $$-pj\frac{[\,]}{z_1} = \frac{V}{a^2+b^2} \cdot \left[ b \cdot \cosh \frac{2\pi b(h-z)}{\lambda} \cdot \cos \left\{ pt + \frac{2\pi a(h-z)}{\lambda} + \frac{2\pi NB(r-a_1)}{\lambda} \right\} \right.$$

$$+ a \cdot \sinh \frac{2\pi b(h-z)}{\lambda} \cdot \sin \left\{ pt + \frac{2\pi a(h-z)}{\lambda} + \frac{2\pi NB(r-a_1)}{\lambda} \right\}$$

$$- b \cdot \epsilon^{\frac{-2\pi b(h-z)}{\lambda}} \cdot \cos \left\{ \frac{2\pi a(h-z)}{\lambda} + \frac{2\pi NB(r-a_1)}{\lambda} \right\} \cdot \cos pt$$

$$\left. + a \cdot \epsilon^{\frac{-2\pi b(h-z)}{\lambda}} \cdot \sin \left\{ \frac{2\pi a(h-z)}{\lambda} + \frac{2\pi NB(r-a_1)}{\lambda} \right\} \cdot \cos pt \right]$$

It follows therefore $$H \equiv \left(\frac{a_1}{r}\right)^{1/2} \cdot \frac{\alpha}{\mu(a^2+b^2)} \cdot \frac{v_0}{2\pi a_1} \cdot \epsilon^{\frac{-2\pi N(r-a_1)}{\lambda}} \cdot$$

$$\cdot \left[ a \cdot \sinh \frac{2\pi b(h-z)}{\lambda} \cdot \sin \left\{ pt + \frac{2\pi a(h-z)}{\lambda} + \frac{2\pi NB(r-a_1)}{\lambda} \right\} \right.$$

$$+ b \cdot \cosh \frac{2\pi b(h-z)}{\lambda} \cdot \cos \left\{ pt + \frac{2\pi a(h-z)}{\lambda} + \frac{2\pi NB(r-a_1)}{\lambda} \right\}$$

$$\left. + \sqrt{a^2+b^2} \cdot \epsilon^{\frac{-2\pi b(h-z)}{\lambda}} \cdot \sin \left\{ \frac{2\pi a(h-z)}{\lambda} + \frac{2\pi NB(r-a_1)}{\lambda} - \tan^{-1}\frac{b}{a} \right\} \cdot \cos pt \right]$$

The above indicates that so far as the $D_r$ component is concerned the Poynting effect depends upon a prefactor $\frac{V}{a^2+b^2}$ for the sinh.sin expression in H. The cosh.cos term however will be seen to play a considerable part in the derivation (see below) of the $D_z$ component of radiation. The wave front of the progressive wave of H is seen, as stated above, to have substantially the same type of inclination with regard to the $z$ axis.

*Progressive wave of axial electric displacement.*—With regard to the latter we have $$\frac{dD_z}{dt} = \frac{1}{r} \cdot H + \frac{dH}{dr}$$

(see l. c. page 527). Transposing in the above differential equation we find $$D_z = \frac{-j}{p}\left(\frac{1}{r}H + \frac{dH}{dr}\right)$$

Considering the separate elements, then with regard to the progressive H terms of $\frac{dH}{dr}$ in $D_z$, as a function of $r$ we can write for $H_p$ of the former the following $$H_p = A'\left(\frac{a_1}{r}\right)^{1/2} \cdot \epsilon^{-B'r} \cdot \left\{ \alpha \cdot \sin(pt+C'r+D') + \beta \cdot \cos(pt+C'r+D') \right\}_0$$

Thus differentiating to $r$ we have $$\frac{dH_p}{dr} = A'\left(\frac{a_1}{r}\right)^{1/2} \cdot \epsilon^{-B'r} \cdot C' \cdot \left\{ \alpha \cdot \cos(pt+C'r+D') - \beta \cdot \sin(pt+C'r+D') \right\}_1$$

$$+ A' \cdot \{\,\}_0 \cdot \frac{d}{dr}\left\{\left(\frac{a_1}{r}\right)^{1/2} \cdot \epsilon^{-B'r}\right\}_2$$

However, in terms of the time operator $j$ we can equivalently write $$\{\,\}_1 = j\{\,\}_0$$

whereas for $\frac{d}{dr} \cdot \{\,\}_2$ we have the following:

$$\frac{d}{dr}\{\,\}_2 = -B' \cdot \left(\frac{a_1}{r}\right)^{1/2} \cdot \epsilon^{-B'r} - \epsilon^{-B'r} \cdot \frac{1}{2} \cdot \frac{a_1^{1/2}}{r^{3/2}} \cdot = -\left(\frac{a_1}{r}\right)^{1/2} \cdot \epsilon^{-B'r}\left\{B' + \frac{1}{2r}\right\} \cdot$$

Introducing the latter in the above gives $$\frac{dH_p}{dr} = C' \cdot j \cdot H_p - \left\{B' + \frac{1}{2r}\right\} \cdot H_p$$

Taking, therefore, the complete progressive wave component or $D_{zp}$ we have $$D_{zp} = \frac{NB}{V} \cdot H_p + \left(\frac{NA}{V} - \frac{1}{2rp}\right) \cdot (jH_p)$$

Thus it is seen that $\frac{NB}{V}$ times the progressive wave portion of H compounds therewith to form a Poynting radiation effect.

$$H_s = \left(\frac{a_1}{r}\right)^{1/2} \cdot \frac{a}{\mu V \sqrt{a^2+b^2}} \cdot \frac{v_0}{2\pi a_1} \cdot \epsilon^{\frac{-2\pi NA(r-a_1)}{\lambda}} \epsilon^{\frac{-2\pi b(h-z)}{\lambda}}$$

$$\cdot \sin\left\{\frac{2\pi a(h-z)}{\lambda} + \frac{2\pi NB(r-a_1)}{\lambda} - \tan^{-1}\frac{b}{a}\right\} \cdot \cos pt$$

which as a function of $r$ can for convenience be written in the following form $$H_s = A'' \cdot \left(\frac{a_1}{v}\right)^{1/2} \cdot \epsilon^{-B''r} \cdot \sin(C''r + D'') \cdot \cos pt$$

$$\frac{dH_s}{dr} = A'' \left(\frac{a_1}{r}\right)^{1/2} \cdot \epsilon^{-B''r} \cdot C'' \cdot \cos(C''r+D'') \cdot \cos pt + A'' \cdot \frac{d}{dr}\left\{\left(\frac{a_1}{r}\right)^{1/2} \cdot \epsilon^{-B''r}\right\} \cdot \sin(C''r+D'') \cdot \cos pt.$$

It is therefore seen that we have $$\left(\frac{1}{r} + r_1\right) H_s = \left\{C''J - B'' + \frac{1}{2r}\right\} H_s$$

from which latter the value $D_{ss}$ is to be obtained.

So far as the galvanic effects are concerned in straight wire antennas these can be obtained in an analogous manner and in so far as distributed capacity allows a cylindrical sheet of current to pass axially even in the case of a coil antenna these effects are certainly present and important. In fact the distributed capacity effect of a coil antenna can be increased by employing ribbon wire and immersed in an oil dielectric value for this very purpose. In certain cases the oil may have hysteretic characteristics if desired.

Turning now to the stationary wave portion $D_{ss}$ we have

*Efficiency of radial component of Poynting energy flow.*—In order to evaluate the radiation energy, quite apart from losses due to the stationary wave excitation, it will be of interest to consider the several progressive wave factors together. For the radial progressive wave $D_{rp}$ we have the expression $$D_{rp} = \left(\frac{a_1}{r}\right)^{1/2} \cdot \frac{\alpha}{\mu V^2} \cdot \frac{v_0}{2\pi a_1} \cdot \epsilon^{\frac{-2\pi N(r-a_1)}{\lambda}} \cdot \sinh\frac{2\pi b(h-z)}{\lambda} \cdot \sin\left\{pt + \frac{2\pi a(h-z)}{\lambda} + \frac{2\pi NB(r-a_1)}{\lambda}\right\}.$$

In forming the Poynting factor for the radial product of the radiation vector $W$ we need only consider the part $H_{pw}$ which is in time phase with $D_{rp}$. That is $$H_{pw} = \left(\frac{a_1}{r}\right)^{1/2} \cdot \frac{\alpha}{\mu(a^2+b^2)} \cdot \frac{v_0}{2\pi a_1} \cdot \epsilon^{\frac{-2\pi NA(r-a_1)}{\lambda}} a \cdot \sinh\frac{2\pi b(h-z)}{\lambda} \cdot \sin\left\{pt + \frac{2\pi a(h-z)}{\lambda} + \frac{2\pi NB(r-a_1)}{\lambda}\right\}.$$

The instantaneous watts per unit of area $w_r$ are therefore given by $$E_{rp} \cdot H_{pw} = \frac{a_1}{r} \cdot \frac{\alpha^2}{\mu} \cdot \frac{1}{a^2+b^2} \cdot \frac{v_0^2}{(2\pi a_1)^2} \cdot \epsilon^{\frac{-4\pi NA(r-a_1)}{\lambda}} a \cdot \sinh^2\frac{2\pi b(h-z)}{\lambda}$$

$$\cdot \sin^2\left\{pt + \frac{2\pi a(h-z)}{\lambda} + \frac{2\pi NB(r-a_1)}{\lambda}\right\}$$

The average value of the square of a sine function over a complete period is one-half and thus $$w_r \text{ (average)} = \frac{1}{2} \cdot \frac{a_1}{r} \cdot \frac{\alpha^2}{\mu} \cdot \frac{1}{a^2+b^2} \cdot \frac{v_0^2}{(2\pi a_1)^2} \cdot \epsilon^{\frac{-4\pi NA(r-a_1)}{\lambda}} \cdot a \sinh^2\frac{2\pi b(h-z)}{\lambda}$$

The aggregate watts can be obtained by integrating over the surface $at$ for example, and then we have $$w_{rp} \text{ (average)} = \frac{1}{2} \cdot \frac{\alpha^2}{\mu} \cdot \frac{1}{a^2+b^2} \cdot \frac{v_0^2}{(2\pi a_1)^2} \cdot a \cdot \sinh^2\frac{2\pi b(h-z)}{\lambda}.$$

The total watts $W_r$ will be given by first multiplying by $2\pi a_1$ and then integrating from $z=0$ to $z=h$. That is we have $$W_r = \frac{1}{2} \cdot \frac{\alpha^2}{\mu} \cdot \frac{a}{a^2+b^2} \cdot \frac{v_0^2}{2\pi a_1} \int_0^h \sinh^2\frac{2\pi b(h-z)}{\lambda} \cdot dz$$

which results in the expression $$W_r = \frac{1}{4\pi} \cdot \frac{\alpha^2}{\mu} \cdot \frac{a}{a^2+b^2} \cdot v_0^2 \cdot \left(\frac{h}{a_1}\right) \cdot \left\{ \frac{\lambda}{4\pi b h} \cdot \sinh \frac{4\pi b h}{\lambda} - 1 \right\}.$$

It is the above formula that needs to be so coordinated with regard to $n_1$ and $n_2$ that it remain a maximum, for we have $$\mu'\sqrt{(1-n_1 n_2) - j(n_1+n_2)} = a - bj$$

$$a = \mu'\sqrt{\frac{(1-n_1 n_2) + \sqrt{(1-n_1 n_2)^2 + (n_1+n_2)^2}}{2}} \; ; \; b = \mu'\sqrt{\frac{-(1-n_1 n_2) + \sqrt{(1-n_1 n_2)^2 + (n_1+n_2)^2}}{2}}$$

With regard to efficiency of radial radiation $\eta_r$ it is thus necessary only to consider the ratio of the above function $W_r$ to the total watt consumption $W_t$. We have therefore $$\eta_r = \frac{W_r}{W_t} = \alpha^2 \cdot a \cdot \frac{\left(\frac{h}{a_1}\right)}{\mu V C_1} \cdot \frac{\frac{\lambda}{4\pi b h} \cdot \sinh \frac{4\pi b h}{\lambda} - 1}{\left[ (a+bn_2) \cdot \sinh \frac{4\pi b h}{\lambda} + (an_2-b) \cdot \sin \frac{4\pi a h}{\lambda} \right]}$$

*Efficiency of axial component of Poynting energy flow.*—Turning to the axial progressive component of displacement it was shown above that the in-phase component of $D_{2p}$ was given by the function $\frac{NB}{V} \cdot H_p$. For a time Poynting effect the out of phase component in time $\left(\frac{NA}{V} - \frac{1}{2rp}\right)$ is negligible since it cannot contribute any energy effect. Thus for the axial instantaneous watts per unit of area we have the expression $$w_{zp} = \mu V^2 \cdot \left\{ \frac{NB}{V} \cdot H_p \right\} \cdot H_p = \mu V N B \cdot H_p^2$$

Introducing the value of $H_p$ and knowing that we can neglect sinpt.cospt terms when integrating over a complete cycle we have $$w_{zp} = VNB \cdot \frac{a_1}{r} \cdot \frac{\alpha^2}{\mu(a^2+b^2)^2} \cdot \frac{v_0^2}{(2\pi a_1)^2} \cdot \epsilon^{\frac{-4\pi NA(r-a_1)}{\lambda}} \cdot \left[ a^2 \cdot \sinh^2 \frac{2\pi b(h-z)}{\lambda} \cdot \right.$$

$$\left. \sin^2 \cdot \left\{ pt + \frac{2\pi a(h-z)}{\lambda} + \frac{2\pi NB(r-a_1)}{\lambda} \right\}_s + b^2 \cdot \cosh^2 \frac{2\pi b(h-z)}{\lambda} \cdot \cos^2 \{ \quad \}_s \right].$$

Again because the average value for the square of a sinoidal time function is one-half, on multiplying by $2\pi a_1$ for the case where $r=a_1$ we have for the total energy lost, on integrating over the entire surface of the antenna $$W_z = \frac{1}{4\pi} \cdot \frac{VNB}{\mu} \cdot \frac{\alpha^2}{(a^2+b^2)^2} \cdot \frac{v_0^2}{a_1} \cdot \int_0^h \left[ (a^2+b^2) \cdot \sinh^2 \frac{2\pi b(h-z)}{\lambda} + b^2 \right] \cdot dz$$

However, for the integral it necessarily follows $$\int_0^h = (a^2+b^2) \cdot h \cdot \left\{ \frac{\lambda}{4\pi b h} \cdot \sinh \frac{4\pi b h}{\lambda} - 1 + \frac{b^2}{a^2+b^2} \right\}$$

$$= (a^2+b^2) \cdot h \left\{ \frac{\lambda}{4\pi b h} \cdot \sinh \frac{4\pi b h}{\lambda} - \frac{a^2}{a^2+b^2} \right\}$$

which gives finally $$W_z = \frac{1}{4\pi} \cdot \frac{\alpha^2}{\mu} \cdot \frac{VNB}{a^2+b^2} \cdot v_0^2 \cdot \left(\frac{h}{a_1}\right) \cdot \left\{ \frac{\lambda}{4\pi b h} \cdot \sinh \frac{4\pi b h}{\lambda} - \frac{a^2}{a^2+b^2} \right\}.$$

The efficiency ratio $\eta_z$ is correspondingly $$\eta_z = \frac{W_z}{W_t} = \alpha^2 \cdot \frac{VNB}{\mu V C_1} \cdot \frac{h}{a_1} \cdot \frac{\frac{\lambda}{4\pi b h} \sinh \frac{4\pi b h}{\lambda} - \frac{a^2}{a^2+b^2}}{\left[ (a+bn_2) \cdot \sinh \frac{4\pi b h}{\lambda} + (an_2-b) \cdot \sin \frac{4\pi a h}{\lambda} \right]}$$

Figure 1:
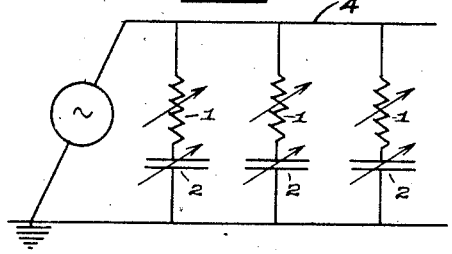
Fig. 1 illustrates a wireless telegraphic system in which lumped hysteretic capacities are distributed along an antenna structure to simulate uniformly distributed hysteretic capacity effects.
Figure 2:
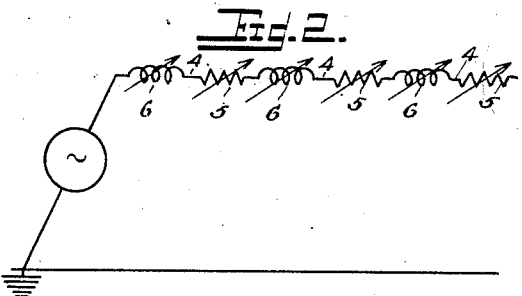
Fig. 2 illustrates a wireless telegraphic system in which lumped hysteretic inductances are distributed along an antenna structure to simulate uniformly distributed hysteretic self-induction effects. In this case also the earth itself may or may not provide the required capacitative hysteretic resistance.
Figure 3:
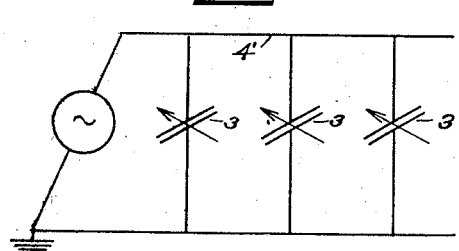

Fig. 3 corresponds to a combination of the effects of Fig. 1 combined with those in Fig. 2. Thus the antenna wire proper may be of iron wire or the like, whereas the lumped capacities to ground may be immersed in a dielectric hysteresis producing oil. Such hysteretic capacitances are diagrammatically represented by sloped parallels.

Figure 4:
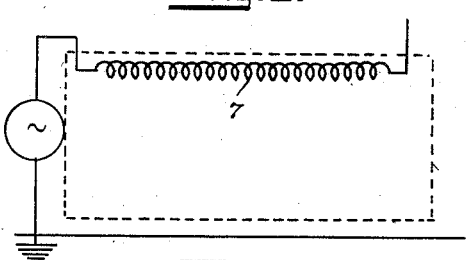

Fig. 4 corresponds to a diagrammatic showing of a coil antenna arranged to have electrostatic hysteresis generated therein. This latter may be obtained by winding the coil upon a wooden drum or the like or providing the proper kind of covering for the wire. The coil itself may likewise be immersed in a hysteresis producing oil, as indicated by dotted lines.

Figure 5:
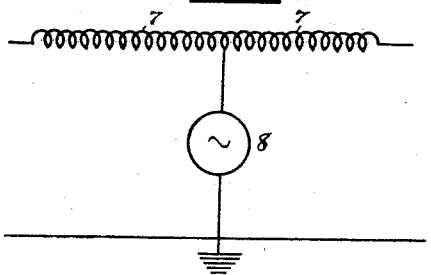

Fig. 5 represents a diagrammatic showing of a coil antenna fed from the central portion of the coil and thus capable of sending out waves from both branches.

Figure 6:
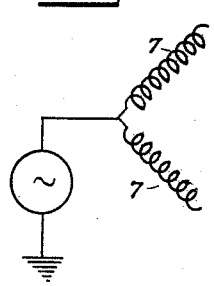

Fig. 6 represents a further modification of the showing in Fig. 5 with a view to producing focusing or directive effects from the two branches illustrated in Figures 5 or 6.

Figure 7:
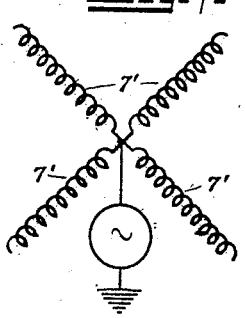

Fig. 7 represents a further modification in which a plurality of branches similar to those in Fig. 6 are provided in order to produce a cone-shaped antenna in order to intensify the directive effects of the radiations.

Figure 8:
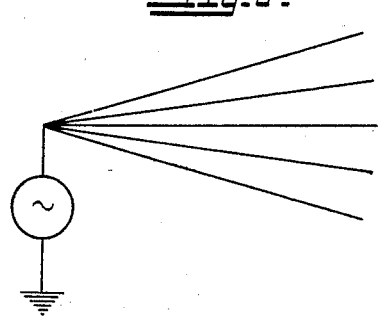

Fig. 8 is a diagrammatic showing of a conically arranged set of substantially horizontal antenna wires similar in effect to Fig. 7 intended to produce a directive effect by virtue of the inclination of the wave front produced from the separate antenna wires.

Figure 9:
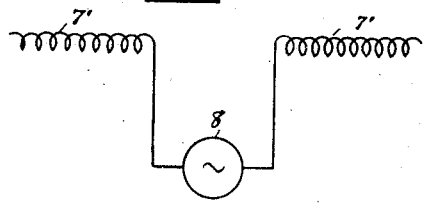

Fig. 9 illustrates a coil antenna system such as might be employed either on an aeroplane or on the ground. It corresponds to a modification of the Hertzian doublet. The shell of the aeroplane, indicated in dotted lines, would correspond to ground in the latter's experiments.

Figure 10:
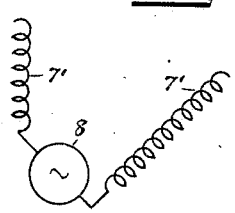

Fig. 10 illustrates a modification of Fig. 9 with inclined antenna coils.

Figure 11:
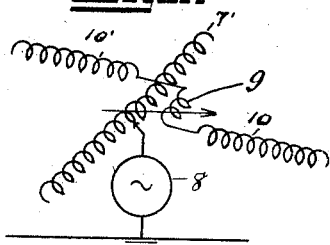

Fig. 11 illustrates diagrammatically a method of producing elliptically (or circularly) polarized waves. The coupling shown is magnetic, but in reality can be to quite a degree capacitied because of the spacing of the one coupling coil with respect to the other. This would not be the case if a conductive coupling was used in this instance.

Figure 12:
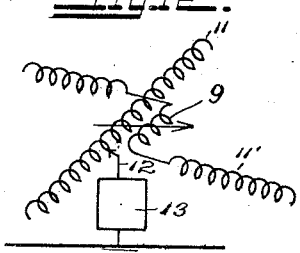

Fig. 12 is a modification of Fig. 5 applicable also for aeroplane reception where the trailing wire replaces the ground connection to a greater or less degree.

Figure 13:
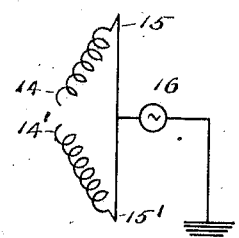

Fig. 13 is a modification of Fig. 6 with, however, the excitation not from the center outwards, but contrariwise with the free ends nearer together.

Figure 14:
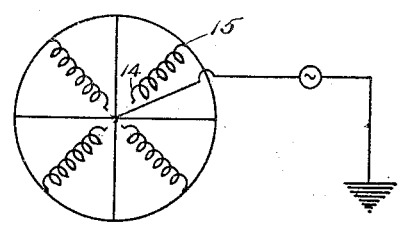

Fig. 14 is an extension of Fig. 6 to antennas having a plurality of coils, and in this sense is a modification of Fig. 8.

Figure 15:
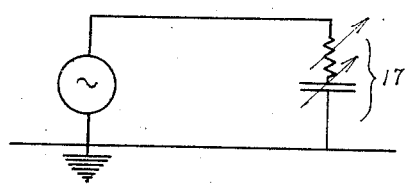

Fig. 15 illustrates a modification of an antenna system with a complex reactance load serving as a terminal apparatus.

Figure 16:
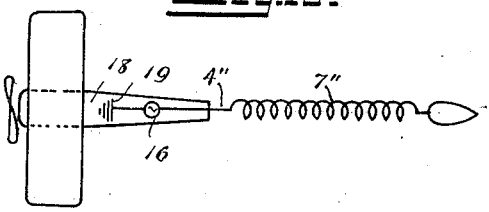

Fig. 16 is illustrative of a trailing coil antenna attached by means of a lead wire of any desired spacing length to an aeroplane.

Figure 17:
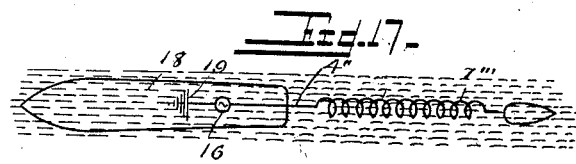

Fig. 17 is similar to Fig. 16 but as applied to submerged submarine work. In both cases the generator per se can be attached externally or internally to the metal framework if desired.

Fig. 18 represents a graph setting forth not only the manner in which potential nodes progressively travel along an antenna, but gives an idea of how the voltage amplitude is maintained along an antenna structure.

It should be stated that in the showing of Figures 6, 7 and 8 the arrangement of antenna coils or wires can be such as to direct the radiation adjustably in any direction desired very much as one employs a hand searchlight on an automobile.

Whereas the coil antennæ indicated in Figures 4, 5, 6 and 7 work substantially from an enectrostatic wave component, the figures depending upon the showing of substantially straight wires really operate from both a magnetic point of view and an electrostatic one.

In Figure 1 I have provided variable resistance elements 1 in series with capacity elements 2 to simulate the effect of hysteretic capacitances 3, which latter can be obtained by immersing non-hysteretic capacitances in oil or the like. Thus equivalently paper condensers can be employed for example. In fact, any dielectric having a hysteretic characteristic can be employed, such as bakelite, condensite, etc.

In Figure 1 the line wire 4 may be either of magnetic material or not, depending upon the amount of magnetic hysteresis desired or skin effect produced. Thus in Figure 2, also, I have deliberately introduced lumped resistances 5 and lumped inductances 6 into the antenna wire in order to increase the hysteretic effect. In Figure 2, however, it will be seen that reliance is wholly made to the pure or relatively pure condensance of the antenna with respect to ground. However, in the case of high frequencies the inductances 6 will invariably have a certain amount of distributive capacity effect which latter may introduce dielectric hysteresis, depending upon the material upon which the coils are wound or the insulation between terms that may be provided.

In Figure 3 the line wire 4' may be made up of magnetic material, such as iron wire, whereas the capacitances to earth may be made up of lumped condensances immersed in oil or the like, the dielectric hysteresis of which can be adjustably regulated by varying the proportion of the two oil ingredients one of which may be practically free from hysteresis whereas the other may be very susceptible thereto. This latter method of mixing of oils offers an alternative for adjusting the requisite amounts of hysteretic condensances to be distributed along the antenna structure. It should be borne in mind that tuning in the ordinary sense is not thought of, but rather such an amount of condensance adjustment is to be resorted to as will give the best voltage distribution wave along the antenna which by its traveling effect along the antenna thereby produces progressive waves into the ether.

In Figure 4 I have continued the coil method indicated in part in Figure 2 still further. Thus Figure 4 allows of a considerable shortening of the antenna structure for a given wave length over that either of Figure 2 or of Figure 1. This has manifest advantages, for it would seem that it is no longer to be considered necessary to extend antenna wires for long wave lengths over miles of territory. The essential characteristic of the system indicated in Figure 4 is that the coil antenna 7, which may be either vertical or horizontal, preferably the latter because of more even capacitance distribution, necessarily has a magnetic or electric hysteretic characteristic, or both. The magnification of hysteretic quality can be obtained by means of the many indications of method illustrated above.

In Figures 5 and 6 the capacity effect of the coil antennas is principally with respect to ground, although in Figures 9 and 10 I have indicated modifications in which the coil antennas 7' are excited from the opposite ends of a high frequency voltage producing source 8; such source in every instance may be either of the impulse type or continuous wave type or spark type, well known to the art. In conformity with all the figures of the drawing in connection with aircraft work, the earth would be simulated by the metallic frame of the aircraft body in accordance with the showing of Figures 4 to 7, or the aircraft body may constitute a neutral with respect to the coil antenna 7' illustrated in Figures 9 and 10.

Turning to the case of Figure 7 in view of the showing with respect to inclined wave fronts of the electrostatic waves sent out, it should follow that with a proper inclination of the several coils illustrated to form a cone-like structure that a magnified effect could be produced in a direction parallel to the axis of the conically arranged antennas. This principle should apply equally well to Figure 8, wherein the apex of the cone need not necessarily be higher than the mean height of the cone base.

Other embodiments necessarily flow from the mathematical development indicated herewith, for it should be clear that because there is an actual difference in phase between the voltage wave sent out with respect to the current wave produced that it should be possible to provide a type of circular or elliptical electromagnetic radiation by providing a transformer coil 9 with respect to the antenna coil 7' so as to produce in the coil arm 10 or 10' voltage waves out of time phase with the impressed voltage wave on the antenna coil 7' and angular space displacement of any desired degree. Thus, in Figure 12 I have indicated an elliptical coil receptor 11, 11', having an adjustable arm 12 to a detector set 13 which may be connected to ground or unipolarly connected to the coil receptor or not. The coupling between the detector set 13 and the receptor coil 11 may be either conductive as indicated in Figure 12, or inductive (electric or magnetic) as would follow from the description of Figure 11.

In Figures 13 and 14 I have disclosed methods of arranging inclined antennas so that the free ends 14 are nearer together than the ends 15 and 15' connected to the source of E. M. F. 16. Two possibilities present themselves. Thus the free ends 14—14' may be directed away from the generator 16 or toward the same. The method of Figures 13 and 14 has its advantages even when the free ends are united together to form a long coil, or series of coils short-circuited at the ends.

In Figure 15 I have shown an arrangement wherein a complex reactance (in this case a capacitance) load is added to the free end of the antenna. This idea can be incorporated in the other showings made herewith.

In Figures 16 and 17 provision is made for employing the framework or shell of the aeroplane submarine or the like as a balance for the antenna coil which can be spaced as far as desirable from the framework or shell. The leader wire 4" can be said to act as a substantially non-radiating terminal reactance so far as the coil antenna proper 7" or 7"' is concerned. This method of connection is seen to be alternative to that disclosed in Figures 9 and 10, for example, when the shell or frame is neutral to the type of Hertzian doublet.

The method of operation is as follows: Upon a wire or wires, coil or coils, whether disposed at right angles or otherwise, hysteretic effects are arranged to be produced preferably in a regularly distributed manner, but if need be by means of lumped inductances and capacitances, thereby creating traveling wave effects whether of current or voltage, so that these traveling waves of voltage or current, or both, may set up in the ether or other medium both electromagnetic waves of the Poynting type and non-radiative stationary type so that intelligence may be transmitted at a distant point according to a law substantially that of Eccles or Austin-Cohen. Thus it is quite conceivable that in certain cases stationary wave effects would be desired as against radiated effects.

As an instance in which stationary wave effects devoid of radiation are extremely desirable, the carrier-wave Morse system developed in particular by Major General George O. Squier, U. S. A., is a case in point. As indicated above, the radiation wave is at the expense of the stationary wave so that in order to reduce the radiation to a minimum it is necessary to suppress as far as possible both the radial and axial progressive wave components set up by hysteresis effects. As a further method of suppression of hysteretic characteristic, the surface material of the conductors should be as far as possible of highly resistant material, yet conductive to a greater or less extent comparable with copper or even its alloys.

Having described the nature of my invention, what I claim is:

A method of regulating the hysteretic capacitive quality of a coil antenna system comprising the step of immersing the antenna in an adjusted mixture of oils having hysteretic and purely dielectric affecting qualities.

In testimony whereof I affix my signature.

ABRAHAM PRESS.